United States Patent [19]
Kuo

[11] Patent Number: 5,921,524
[45] Date of Patent: Jul. 13, 1999

[54] MOTOR SECURING STRUCTURE ADAPTED FOR USE IN ELECTRIC TREADMILLS

[76] Inventor: Hai Pin Kuo, P.O. Box 82-144, Taipei, Taiwan

[21] Appl. No.: 08/986,170

[22] Filed: Dec. 5, 1997

[51] Int. Cl.[6] ..................................................... F16M 1/00
[52] U.S. Cl. ............................ 248/674; 248/666; 482/54
[58] Field of Search ..................................... 248/674, 666, 248/664, 291.1, 292.13; 482/54, 37

[56] References Cited

U.S. PATENT DOCUMENTS

| 3,274,841 | 9/1966 | Roberts | 248/666 |
|---|---|---|---|
| 5,302,162 | 4/1994 | Pasero | 482/54 |

Primary Examiner—Derek J. Berger
Assistant Examiner—Long Dinh Phan
Attorney, Agent, or Firm—Rosenberg, Klein & Bilker

[57] ABSTRACT

A motor securing structure adapted for use in electric treadmills includes a securing seat adapted to support a motor. A lower end of the securing seat uses a pivot rod as a center of deflection, whereas an upper end of the securing seat cooperates with a rigid spring fitted on a securing pin so that they can displace on the securing pin. The structure ensures that a belt fitted on a pulley of the motor transmission shaft has a preferred tension and eliminates any vibration interference resulting from the interaction between the tread belt and the motor.

1 Claim, 4 Drawing Sheets

MOTOR SECURING STRUCTURE ADAPTED FOR USE IN ELECTRIC TREADMILLS

BACKGROUND OF THE INVENTION

1. Field of the Invention

The present invention relates generally to a motor securing structure adapted for use in electric treadmills, and more particularly to a motor securing structure in which the tension of a belt mounted on a pulley of the motor transmission belt can be maintained at a preferred level and any vibration interference resulting from the interaction between the tread belt and the motor can be eliminated.

2. Description of the Prior Art

In electric treadmills, the motor is generally fixedly secured, and the belt between the motor transmission shaft and the driven shaft of the tread belt has a certain t+ension in order to smoothly drive the tread belt without causing slipping. Therefore, the tension borne by the belt is considerable, which may lead to early elastic fatigue and wear. Besides, when the user runs on the tread belt, the resistance generated against the tension of the tread belt causes the tread belt to interact with the motor so that there is the problem of vibration interference. Such a problem will result in elastic fatigue of the belt on the pulley.

SUMMARY OF THE INVENTION

The present invention relates generally to a motor securing structure adapted for use in electric treadmills, and more particularly to a motor securing structure in which the tension of a belt mounted on a pulley of the motor transmission belt can be maintained at a preferred level and any vibration interference resulting from the interaction between the tread belt and the motor can be eliminated.

A primary object of the present invention is to provide a motor securing structure adapted for use in electric treadmills to eliminate the drawbacks with the prior art.

DETAILED DESCRIPTION OF THE PREFERRED EMBODIMENT

Figure 1:
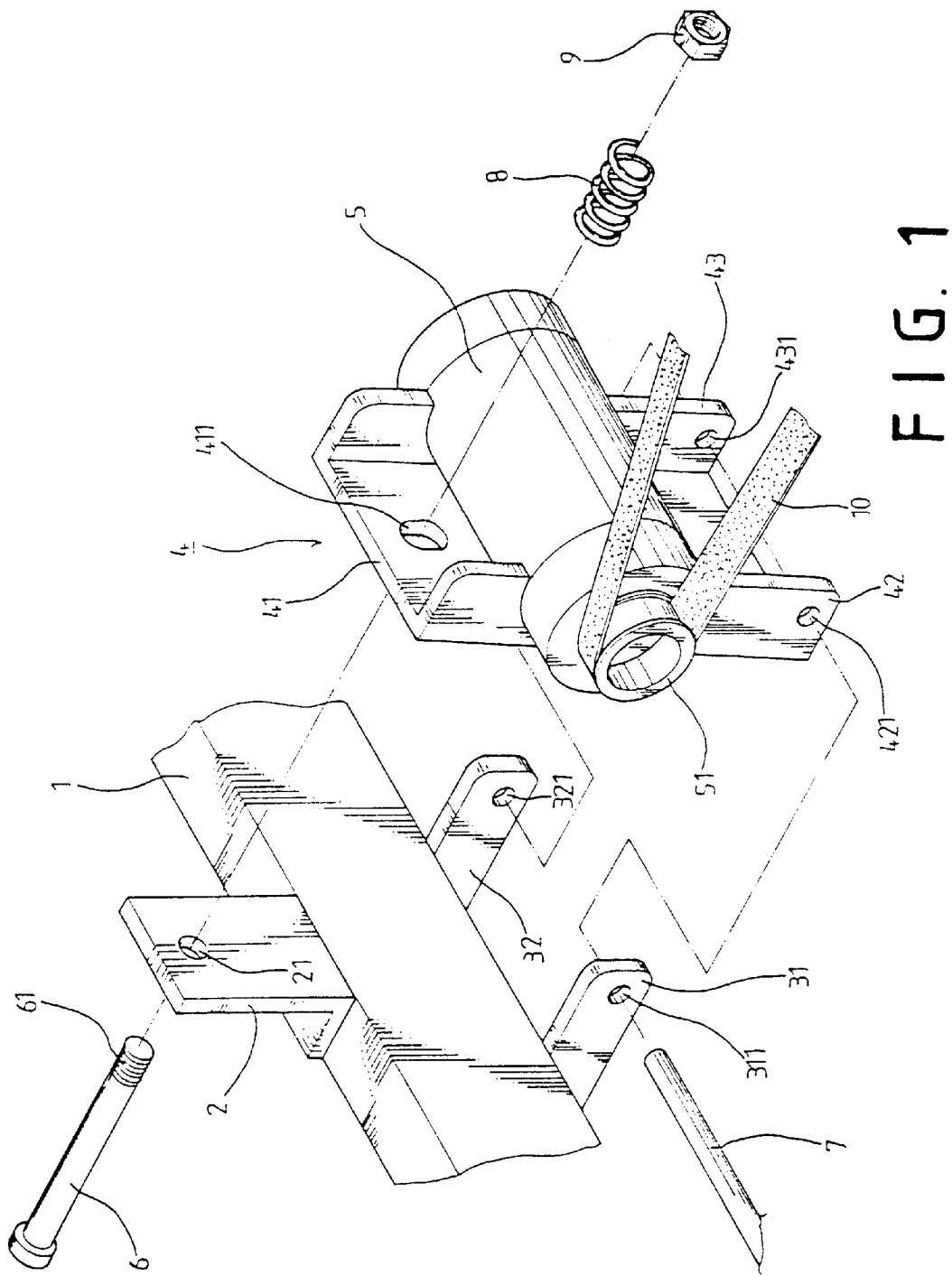
FIG. 1 is a perspective exploded view of the present invention.

With reference to FIG. 1, the present invention comprises a base frame 1; a top support 2 mounted at an upper rim of a front end of the base frame 1, the top support 2 having a round hole 21; two pivotally connected bars 31 and 32 provided at a lower rim of the base frame 1 and spaced suitably apart from each other, the bars 31 and 32 are respectively provided with round holes 311 and 321; a positioning seat 4, including a planar plate 41 having two lateral ends respectively extending to form planar side wings 42 and 43 each having a semi-circular opening at a suitable position; a motor 5 supported on the semi-circular opening of the side wings 42 and 43 of the positioning seat 4, that part of the planar plate 41 above the motor 5 being provided with an elongated oval hole 411 whereas the side wings 42 and 43 are each provided with circular holes 421 and 431 near their lower ends; a securing pin 6 having a threaded end 61 of a suitable length at an outer end thereof, the securing pin 6 extending through the round hole 21 of the top support 2 and the oval hole 411 of the planar plate 41; a pivot rod, extending through the round holes 311 and 321 of the bars 31 and 32 as well as the circular holes 421 and 431 of the side wings 42 and 43, both ends of the pivot rod 7 being riveted such that the positioning seat 4 and the motor 5 may utilize the pivot rod 7 as a center of deflection; and a rigid spring 8, fitted onto the securing pin 6 that extends from the oval hole 411, with a nut 9 locked at the threaded end 61 of the securing pin 6 so that the positioning seat 4 and the motor 5 secured thereon are positioned on the base frame 1. The structure thus erected is shown in FIG. 2.

The lower end of the positioning seat 4 utilizes the pivot rod 7 as the center of deflection. As the upper end of the positioning set 4 is provided with the oval hole 411, it can displace along the securing pin 6.

Figure 2:
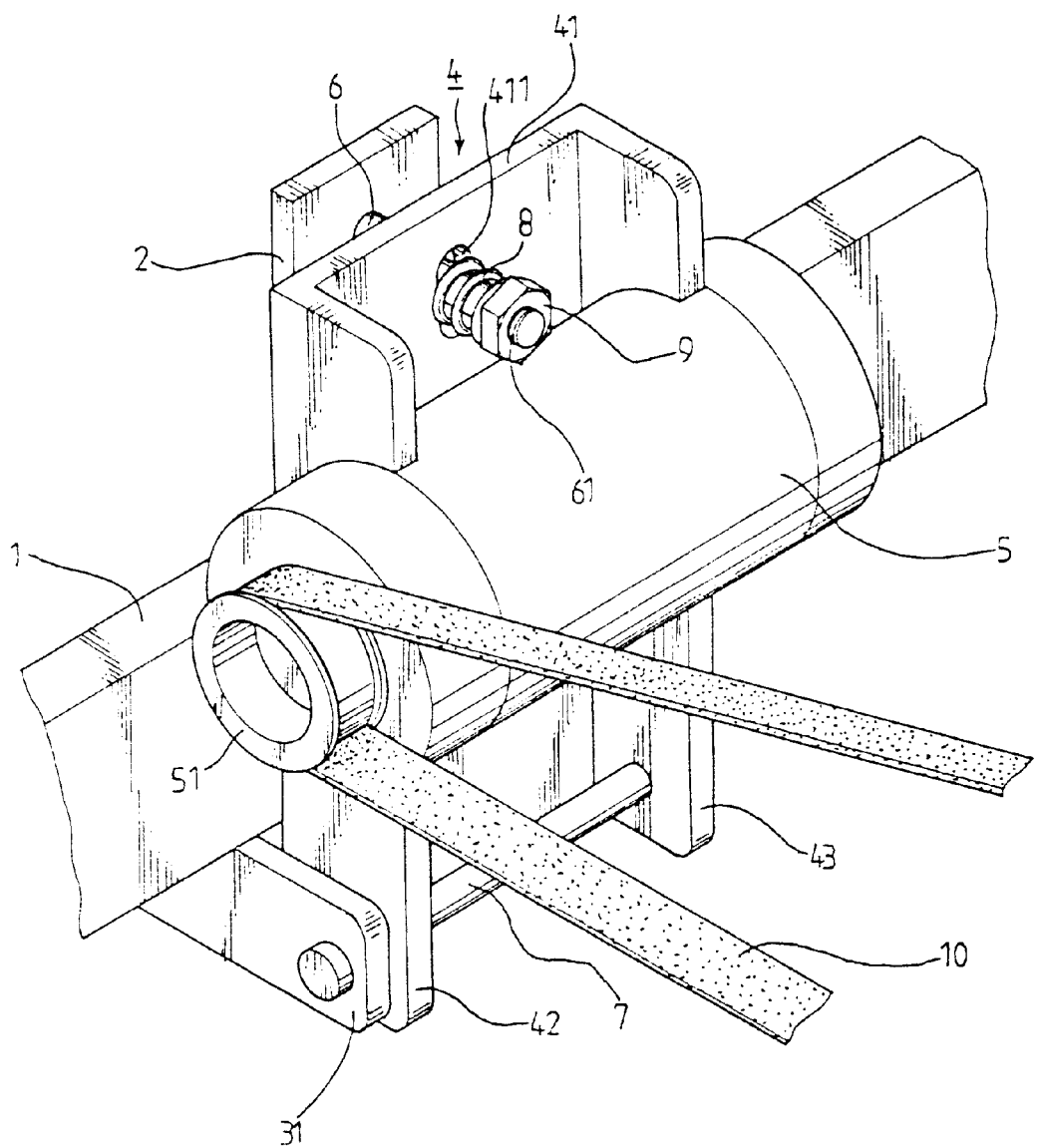
FIG. 2 is a perspective assembled view of the present invention.
Figure 3:
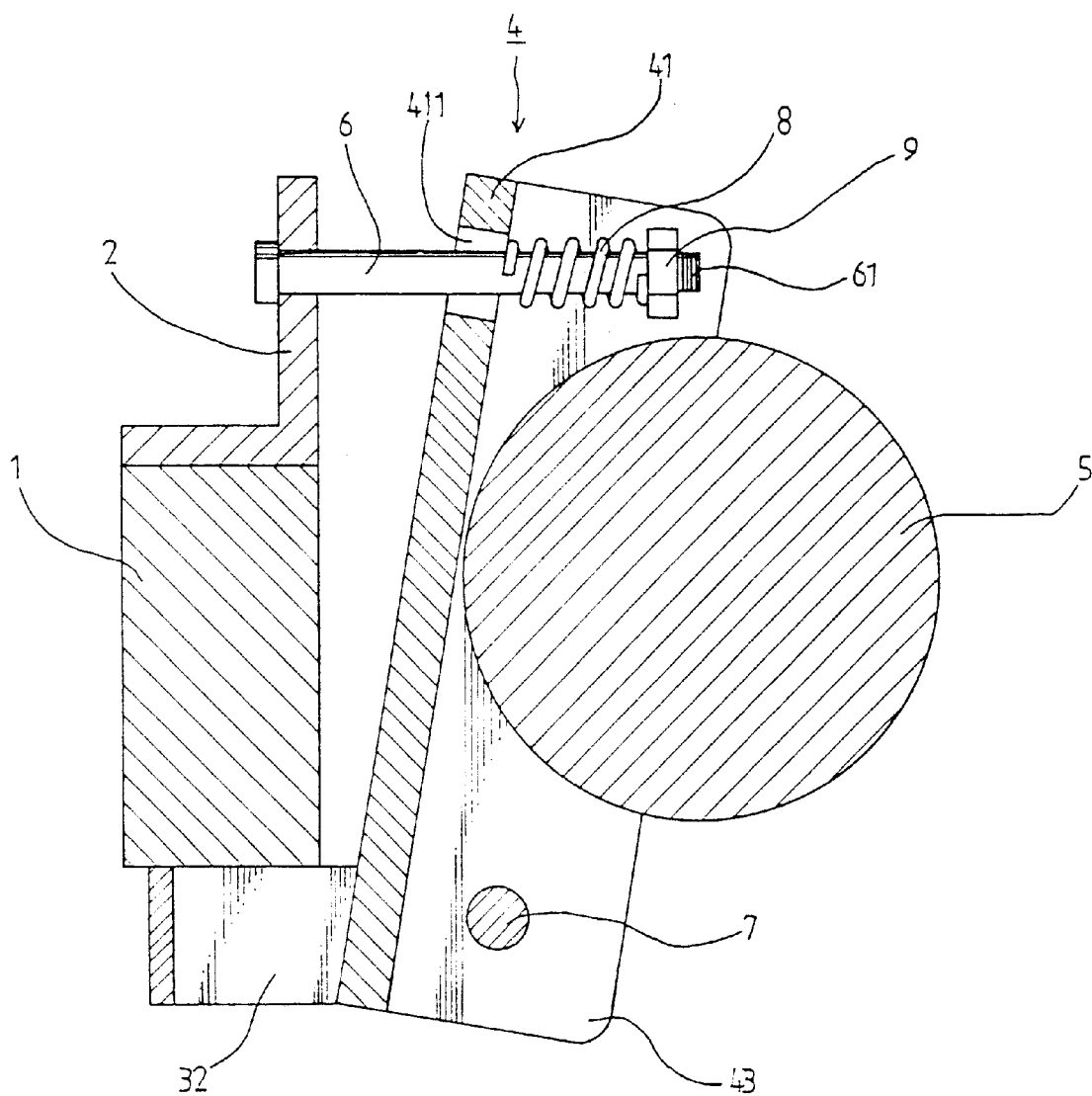
FIG. 3 is an assembled sectional view of the present invention.
Figure 4:
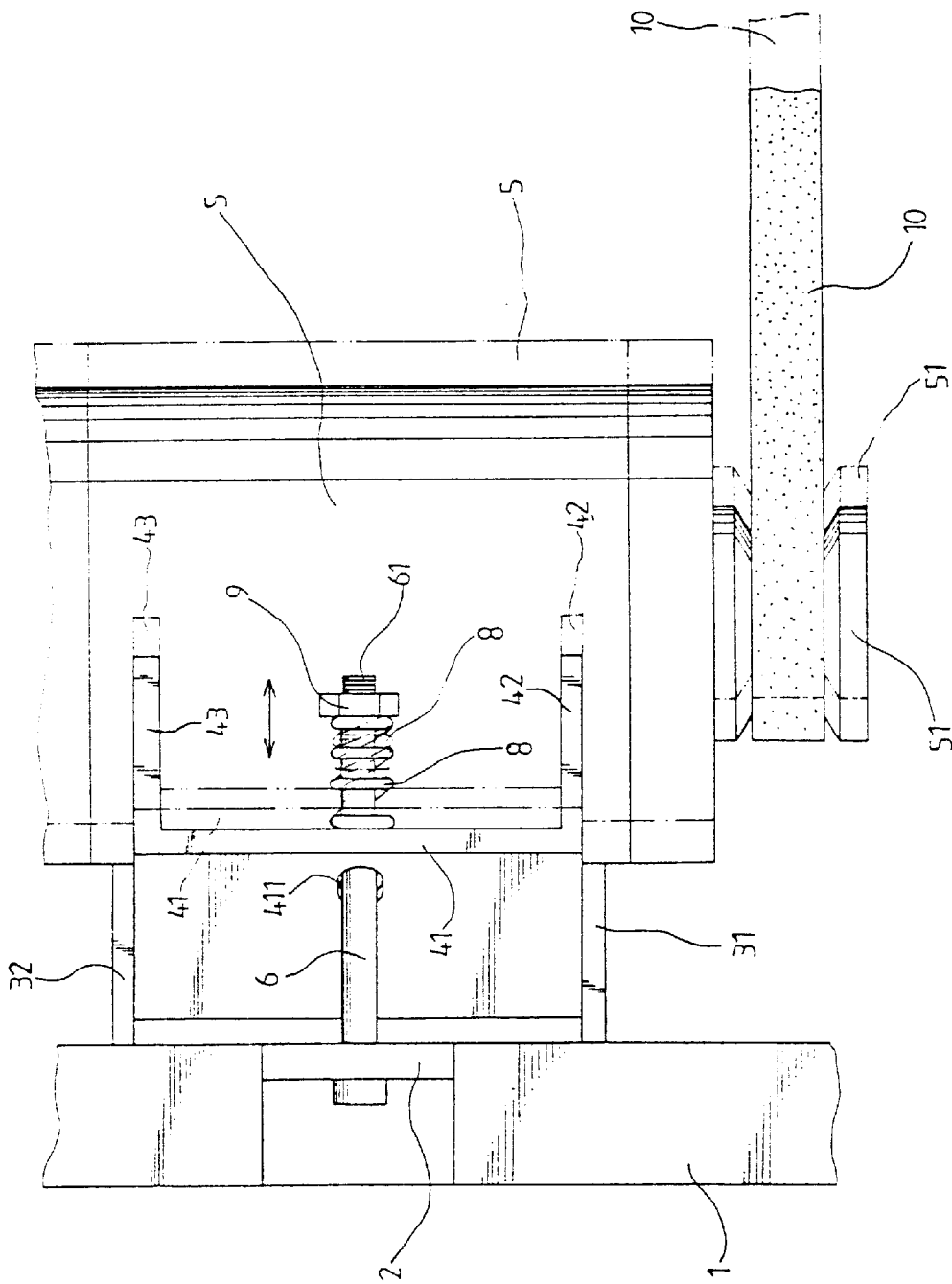
FIG. 4 is a top view illustrating the operation of the present invention.

FIGS. 1, 2 and 3 illustrate the assembly in an initial inactive state. As a pulley 51 of the transmission shaft of the motor 5 is fitted with a belt 10 having tension, the upper end of the positioning seat 4 is subjected to the force so that it may swing slightly against the direction of the top support 2 and be in an inclined state. However, since the rigid spring 8 can reset after being compressed, and the due to the stopping action of the nut 7, the positioning seat 4 also has a balancing force to deflect and displace in the direction of the top support 2 so that the positioning seat 4 is limited. With reference to FIGS. 3 and 4, the belt 10 is connected intermediate the pulley 51 of the motor 5 and a front transmission shaft (not shown) of the tread belt. The belt 10 maintains a certain tension. When the motor 5 is started and drives the belt 10, the belt 10 will generate a considerable tension. But due to the rigid spring 8, the upper end of the securing seat 4 can displace to and fro within a certain range, so that the tension of the belt 10 is in a balanced state, without causing early elastic fatigue of the belt 10. On the other hand, the vibration interference resulting from the interaction between the tread belt and the motor is eliminated. When the belt 10 becomes worn due to frequent use, the elasticity of the rigid spring 8 can make the upper end of the positioning seat 4 suitably displace towards the top support 2 so that the belt 10 can maintain a preferred tension to drive the tread belt without slippage. Furthermore, since the rigid spring 8 and the belt 10 will gradually become worn out due to prolonged use, the position of the nut 9 on the threaded end 61 may be adjusted to enable the belt 10 to maintain a preferred tension.

In view of the foregoing, since the lower end of the securing seat 4 securing the motor 5 utilizes the pivot rod 7 as the center of deflection and the upper end thereof cooperates with the rigid spring 8 to deflect and displace on the securing pin 6, the belt 10 mounted on the pulley 51 of the motor 5 can have a preferred tension to drive the tread belt. At the same time, the present invention eliminates any vibration interference resulting from interaction between the motor 5 and the tread belt. Besides, when the belt 10 has lost certain degree of tension due to wear, the elasticity of the rigid spring 8 can be utilized to cause the positioning seat 4 to displace towards the top support to thereby allow the belt 10 to maintain a preferred tension.

I claim:

1. A motor securing structure adapted for use in electric treadmills, said motor securing structure comprising:

a base frame including a top support mounted at an upper rim of a front end of said base frame and two pivotally connected bars provided at a lower rim of said base frame and spaced suitably apart from each other, said top support having a round hole, and said bars being respectively provided with first and second round holes;

a positioning seat including a planar plate having two lateral ends respectively extending to form planar side wings each having a semi-circular opening at a suitable position adapted to support a motor, that part of said planar plate above the motor being provided with an elongated oval hole while said side wings are each provided with circular holes near their lower ends;

a securing pin having a threaded end of a suitable length at an outer end thereof, said securing pin extending through said round hole of said top support and said oval hole of said planar plate;

a rigid spring fitted onto said securing pin that extends from said oval hole of said securing seat, one end thereby urging against said planar plate of said positioning seat;

a nut locked at said threaded end of said securing pin and limiting the other end of said rigid spring; that said positioning seat and the motor secured thereon are positioned on said base frame; and a pivot rod extending through the round holes of said bars as well as said circular holes of said side wings, whereby a lower end of said securing seat may use said pivot rod as a center of deflection and an upper end of said positioning seat may cooperate with said rigid spring to deflect and displace on said securing pin, so that a belt fitted on a pulley of a motor transmission shaft may have a preferred tension; vibration interference resulting from interaction between the motor and the tread belt can be eliminated; and said rigid spring acts upon said positioning seat to suitably pull the belt to adjust its tension and avoid idle rotation when the latter becomes worn due to frequent use.

* * * * *